Oct. 5, 1948.  T. FOSTER  2,450,788
LATHE ATTACHMENT
Filed March 10, 1945  3 Sheets-Sheet 1

INVENTOR
BY THEODORE FOSTER
Toulmin & Toulmin
ATTORNEYS

Oct. 5, 1948. T. FOSTER 2,450,788
LATHE ATTACHMENT
Filed March 10, 1945 3 Sheets-Sheet 2
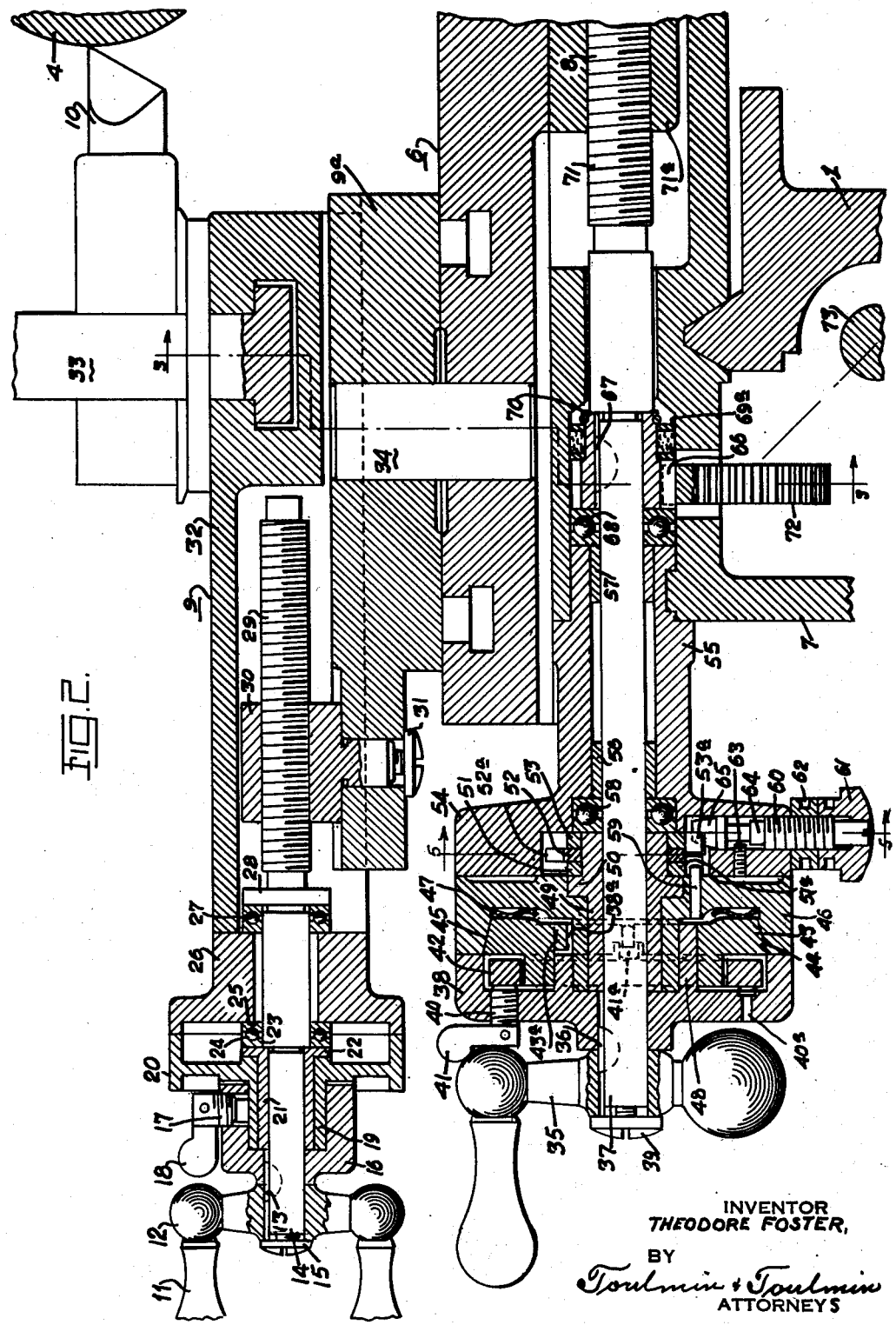
INVENTOR
*THEODORE FOSTER,*
BY
*Toulmin & Toulmin*
ATTORNEYS Oct. 5, 1948. T. FOSTER 2,450,788
LATHE ATTACHMENT
Filed March 10, 1945 3 Sheets-Sheet 3

INVENTOR
BY THEODORE FOSTER
ATTORNEYS

Patented Oct. 5, 1948

2,450,788

UNITED STATES PATENT OFFICE 2,450,788

LATHE ATTACHMENT

Theodore Foster, Sidney, Ohio, assignor to The Monarch Machine Tool Company, Sidney, Ohio, a corporation of Ohio Application March 10, 1945, Serial No. 581,976

8 Claims. (Cl. 82—24)

This invention relates to lathes and, in particular, to mechanism for pre-setting a lathe so it is possible to complete an operation and then to enter into a second operation without further set-up or re-setting of the lathe in order to provide for the manufacture of multiple parts of the same dimension with a single setting of the tools.

It is a primary object of this invention to provide mechanism in a lathe for bringing the tool to a predetermined set position at its ultimate travel and to so arrange the mechanism that after the completion of the cut, the tool may be withdrawn to re-starting position without a readjustment or re-setting thereof so that it continues to repeat the same operation over and over without any tool re-setting.

Specifically, it is the object of the invention to be able to back a tool away from the work by the cross-slide and to return it to exactly the same place for the manufacture of repetitive parts of the same dimension.

It is another object to provide means for feeding in the compound of a lathe so that the compound screw always moves in the same direction, thus eliminating lost motion and providing for more accurate workmanship.

It is a further object to provide adjustable stop means for a lathe cross-slide that is selectively operable.

In the cutting or "chasing" of V threads it is customary to set the compound or tool holder at the same angle as the face of the thread. Then, in order to feed the tool in to take successive cuts the compound is fed in a predetermined amount by its feed screw. After the completion of the number of cuts required completely to form the thread, the cross-slide is fed in a predetermined amount so that the tool bears on both sides of the V and a finishing or clean-up cut is taken.

The aforementioned steps require great care and skill in order to produce accurately machined threads. It is, therefore, a particular object of this invention to provide means for producing highly accurate V threads and the like without the exercise of a high degree of skill.

It is another particular object to provide means for turning threads on a work member by means of which the threads are accurately cut and also by means of which successive workpieces may be turned to substantially identical sizes.

Referring to the drawings:

Figure 2 is a section of the line 2—2 of Figure 1 looking in the direction of the arrows;

Figure 6 is a view showing a telescoping feed screw for the cross-slide which is adapted for use with taper attachments and the like.

Figure 1:
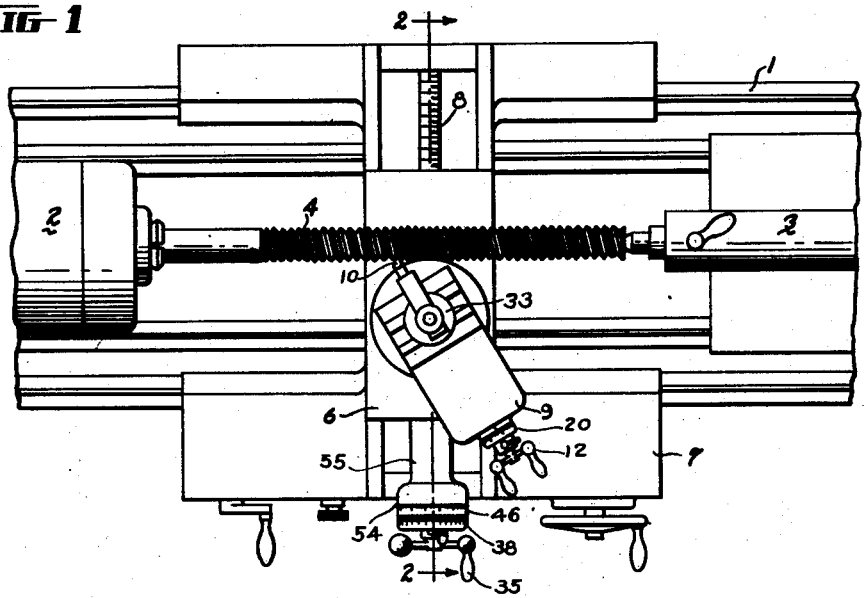
Figure 1 is a plan view of a lathe embodying the invention of this application.

Referring to the drawings more in detail, particularly to Figure 1, I indicates the lathe bed, 2 a head stock and 3 a tail stock supporting the respective ends of a workpiece 4. The workpiece is rotated in the usual manner by a driving mechanism in the head stock.

Mounted on the lathe bed I is a carriage 7 which in turn supports an adjustable cross-slide 6 that is connected operably with the cross-slide screw 8. Mounted on the cross-slide is a compound 9 carrying a cutting tool 10 which suitably engages with the workpiece being turned.

The compound

At 11 is indicated the handle of the hand wheel 12 which is connected by the key 13 to the screw shaft 14 in the compound. The hand wheel 12 is retained on the end of the shaft by the screw 15. Also keyed to the shaft 14 by the key 13 is a sleeve 16 which carries a locking screw 17 that can be actuated by the lever 18. The inner end of this screw engages with a sleeve 19 which is formed on the inner portion of the graduated dial ring 20. This inner sleeve 19 of the dial ring 20 is mounted upon a sleeve 21 which in turn is supported by the shaft 14 and has its one end flanged as at 22 for engagement with one of the races 23 of the ball thrust bearing 24, the other race of which at 25 abuts against the member 26 that is stationarily mounted upon the tool holder support. The other end of the member 26 is engaged by the ball thrust bearing 27 which in turn engages the shoulder 28 on the shaft 14. The shaft 14 is thus supported against axial movement while remaining freely rotatable.

The shaft 14 is projected into a screw 29 operable within the screw-block 30 which is mounted upon the compound base 9a. The screw-block is detachably retained in position by the retaining screw 31. The tool holder support 32 is thereby actuated inwardly and outwardly. This tool holder support 32 carries the adjustable tool holder 33 on which is mounted the tool 10. The compound base 9a is pivotally mounted on the pivot pin 34 fixedly mounted in the cross-slide 6.

Cross-slide

The cross-slide is actuated by a hand wheel 35 which is connected by a key 36 to the cross-slide adjusting screw shaft 37. Also, keyed to the shaft 37 by the key 36 is a collar 38 which comprises indicia as will be seen upon reference to Figures 1 and 4. The collar 38 abuts a sleeve 49 on the shaft 37 which in turn abuts one race of a thrust bearing 58 which is carried in a recess in the member 55 which is rigidly mounted in the carriage 7. At the opposite end of the member 55 from the thrust bearing 58 there is a second thrust bearing 68 one race of which abuts the said member and the other race of which is abutted by a gear 66 keyed to the shaft 37 by a key 67. A shoulder on the shaft 37 abuts the right end of the gear 66 and a screw 39 in the hand wheel end of the said shaft serves to draw the aforementioned parts snugly against the thrust bearings 58 and 68 so that substantially all end play in the shaft 37 is eliminated. A pair of bearings at 56 and 57 support the shaft radially so that the shaft and the parts attached thereto are freely rotatable but have substantially no axial movement.

Located between the graduated collar 38 and an equally sized collar 54 on the member 55 is a graduated ring 46 which is rotatably supported on the sleeve 49. The ring 46 has a conical recess therein indicated at 44 which is adapted for receiving a cam ring 43 which has a similarly shaped conical surface 45. A spring 47 yieldingly resists the movement of the cam 43 into the recess and yieldingly urges it outwardly.

The cam ring 43 comprises a lug 43a which engages a notch 38a in the sleeve portion 48 of the collar 38. The cam ring 43 is thus adapted to rotate with the collar 38 but is shiftable axially relative thereto.

An actuating ring 42 is disposed within a recess in the collar 38 and is adapted for actuation by the screw 40 which has an actuating lever 41 and is also adapted to abut the pin 40a in the member 38 and the spaced pins 41a in the member 43. Actuation of the screw 40 by the lever 41 is effective to move the ring 42 and the cam member 43 rightwardly against the thrust of the spring 47 until the cam surfaces 44 and 45 are in driving engagement.

The sleeve 49 is provided with a shoulder 50 that fits within a recess in the graduated ring 46 and serves as an abutment for retaining a plurality of locking rings in position within a recess in the end of the member 55. These locking rings are designated, respectively, 51, 52 and 53. The locking rings 51, 52 and 53 are provided, respectively, with the locking finger 51a, the locking stop 52a and the locking finger 53a.

The graduated ring 46 has mounted therein a pin 59 which extends into the recess housing the locking rings and in overlapping relationship with the locking finger 51a. Thus, as the graduated ring 46 is rotated the pin 59 picks up the locking finger 51a of the ring 51 thereby to drive the latter.

Threadedly mounted in the portion 54 of the member 55 is a screw 60 which has the locking nuts 61 and 62 thereon. The screw 60 comprises a tapered nose 65 extending into the path of the locking finger 53a of the ring 53 so as to stop the latter at a predetermined point in its rotation.

The screw 60 is provided with a recessed portion 64 into which extends a screw 63 which permits the screw 60 to be backed out from the path of the finger 53a but not completely removed.

The outer end of the shaft 37 is provided with a threaded portion 71 which engages with the nut 71a of the cross-slide 6 so that rotation of the said screw reciprocates the cross-slide 6.

Referring again to the gear 66, this is engaged by a gear 72 which may be connected with the lathe feed rod 73, the purpose of this arrangement being to provide for a gear drive from the feed rod 73 which may be made effective when it is desired to power drive the cross-slide. An oil seal at 70 engages the hub of the gear 66 and the bore 69a for the purpose of retaining the lubricant at the gear 66.

Operation

Figure 4:
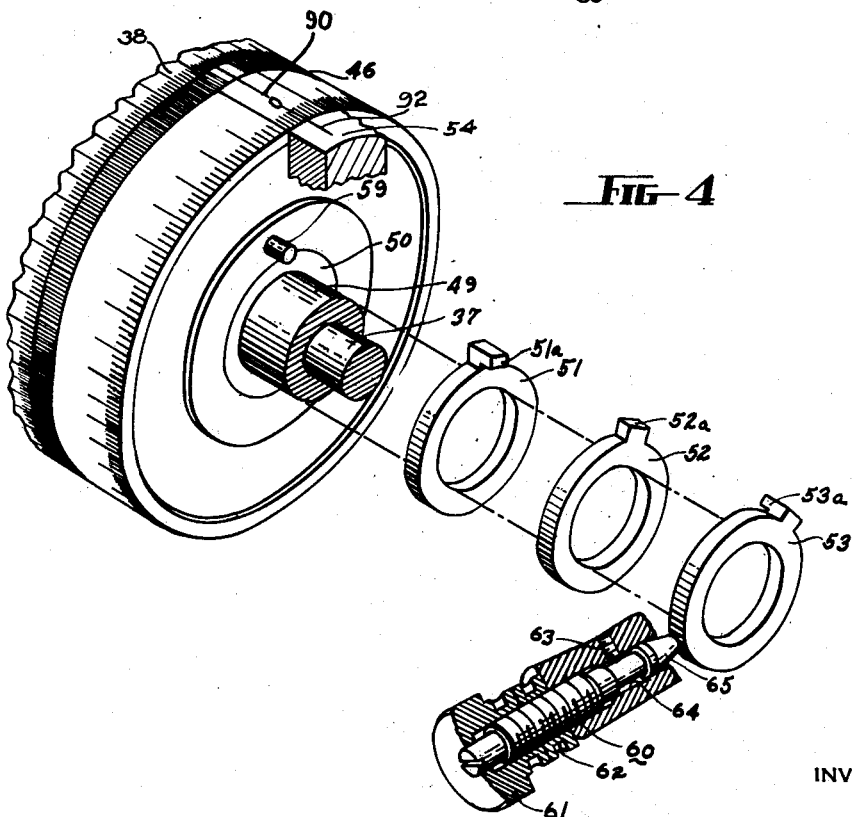
Figure 4 is a perspective view showing the parts which constitute the stop mechanism for limiting the inward movement of the tool toward the work.
Figure 3:
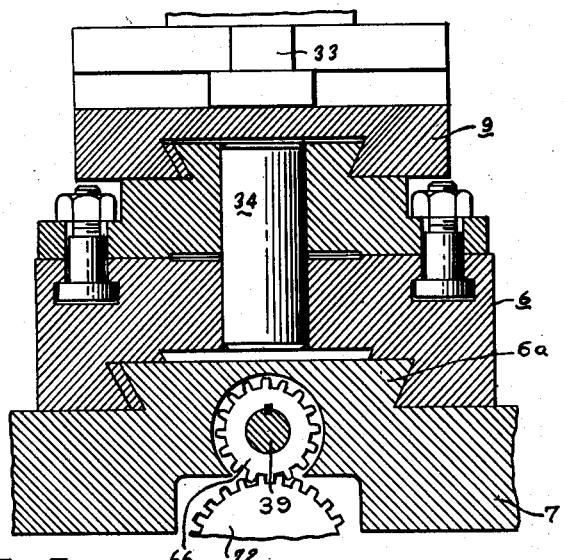
Figure 3 is a section on the line 3—3 of Figure 2.
Figure 5:
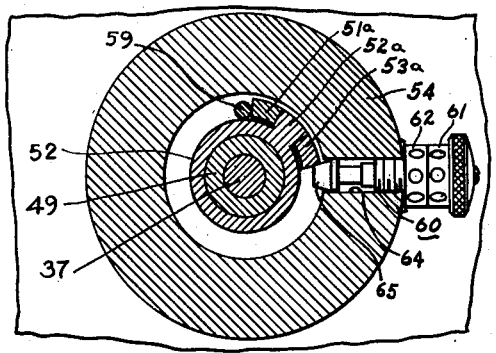
Figure 5 is a section on the line 5—5 of Figure 2 looking in the direction of the arrows and illustrating the relationship of the stop mechanism and its respective parts.

Referring to Figures 2, 4 and 5, it will be observed that the locking rings with their locking fingers and locking stop are adapted for engagement on one side by the pin 59 of the ring 46 and on the other side by the nose 65 of the screw 60 carried by the portion 54. When the hand wheel 35 is rotated in the direction to back away the tool from the work the locking finger 51a, stop 52a and finger 53a disengage and the rings 51, 52 and 53 are free to separate. Thus, approximately three and one-half revolutions of the hand wheel 35 may be made to back the tool away from the work.

However, when the shaft 37 is rotated to move the cross-slide in, the said locking fingers and locking stop are brought into engagement with one another and with the nose 65 of the screw 60 so that the shaft 37 is stopped at a predetermined point of travel.

In operation a workpiece is mounted between the headstock and tailstock, and the cross-slide 6 is positioned by means of screw 71 and handwheel 35. Thereafter, screw 60 is positioned so that nose 65 will engage ring 53, after which the dial ring 46 is rotated clockwise as far as it will go, and is then locked to the collar 38 by actuating the screw 40 to move the cam member 43 into locking engagement with the surface 44. This will bring the locking rings into the position shown in Figure 5, where the shaft 37 is stopped.

The initial infeed of the tool is then accomplished by feeding in the compound slide 32 by means of the hand wheel 12 and screw 29. The first pass across the work is now taken. After the first pass across the work the tool is backed away by means of the hand wheel 35. The carriage is then returned to its starting position, the hand wheel 35 is actuated to return the cross-slide to its innermost position and a new feed is made by again actuating the hand wheel 12 in the same direction as before. It will be noted that the cross-slide is always stopped in precisely the same position and that the compound screw is always rotated in the same direction. Thus, backlash in the cross slide and compound feed screws is eliminated and more accurately finished workpieces result.

If, at any time it is desired to move the cross-slide beyond its stopped position while retaining the graduated ring 46 in engagement with the collar 38, the screw 60 together with the lock nuts 61 and 62 is backed off so that the nose 65 thereof does not lie in the path of the finger 53a. Then rotation of the hand wheel 35 is effective to traverse the cross-slide in either direction for any distance.

It will be noted that the arrangement of the locking rings is such that the cross-slide may be stopped in either its inward or outward directions of movement. The latter would occur if internal cutting operations were being performed.

The locking screw 60 which forms the abutment against which the locking rings are stopped comprises the tapered end portion 65 which provides for a slight adjustment of the said abutment in order to compensate for wear and slight inaccuracies in the mechanism. When the device is assembled the screw 60 is adjusted to bring the zero mark 90 on the dial 46 into register with the index mark 92 of the member 54. Thereafter, the lock nuts 61 and 62 are set and locked together on the screw 60 so as to become an integral portion thereof until wear in the locking device requires further adjustment of the abutment.

In order more fully to understand the operation of this device consider the particular operation of cutting a V thread. In Figure 1 the tool support 32 is set at an angle of 30° from a normal to the axis of the workpiece 4. The tool bit 10 is ground to the proper shape so that the face thereof will form the face of the thread at an angle of 30°.

The workpiece is first mounted between the head stock 2 and the tail stock 3 and the tool 10 is positioned at the beginning of the cut by the cross-slide 6 which is moved by screw 71 and handwheel 35. The screw 60 is then moved into the path of the finger 53a and the dial ring 46 is rotated clockwise as far as it will go, after which the screw 40 is actuated to lock the dial ring 46 to the collar 38.

The first cut is then taken by feeding the tool into the work a predetermined amount by actuating the hand wheel 12 and traversing the said workpiece by moving the carriage by means of the lathe lead screw. At the end of the first cut the cross-slide is retracted by actuating the hand wheel 35 and the tool 10 is thereby backed away from the workpiece. The carriage is then returned to the starting position, the cross-slide is fed in against the stop, the compound is fed in a predetermined amount and a new pass across the workpiece is taken.

These operations are continued until the thread is fully formed. It is then desired to take a clean-up or finishing cut across the thread. To this end, the operator unlocks the cam ring 43 by backing off the screw 40 and feeds the cross slide in so that the tool 10 bears on both sides of the V thread. The workpiece is then traversed by the tool and the finishing cut is completed. It will be noted that the amount of infeed given to the cross-slide may be read on the graduations of the collar 38 as they are rotated past the index mark 90 of the ring 46.

Optionally, the operator may back off the stop screw 60 together with its locking nuts 61 and 62 so that the locking device is ineffective. Then a predetermined amount of infeed may be given to the cross-slide by turning the hand wheel 35 and reading the amount of feed on the graduations of the ring 46 as they pass the index mark 92 of the member 54. Also, optionally, the operator may secure the proper infeed for the finishing cut by unlocking the dial ring 46 and rotating it away from its stopped position the required distance as indicated by the graduations thereon, relocking the ring to the collar 38 and again feeding the mechanism against the stop by the hand wheel 35. Thereafter, the device may be reset for operating the next workpiece either by restoring the screw 60 to its in position or by resetting the dial 46 to its former position and clutching it to the collar 38.

It will be apparent that the compound screw is always rotated in the same direction throughout the machining of a workpiece, the backing off of the tool from the workpiece being accomplished by retracting the cross-slide. Since the cross-slide is always returned against a fixed stop and, since the compound screw is always rotated in the same direction, all back lash and inaccuracies traceable thereto are eliminated and a highly accurate V thread results with the exercise of ordinary care and skill.

Figure 6:
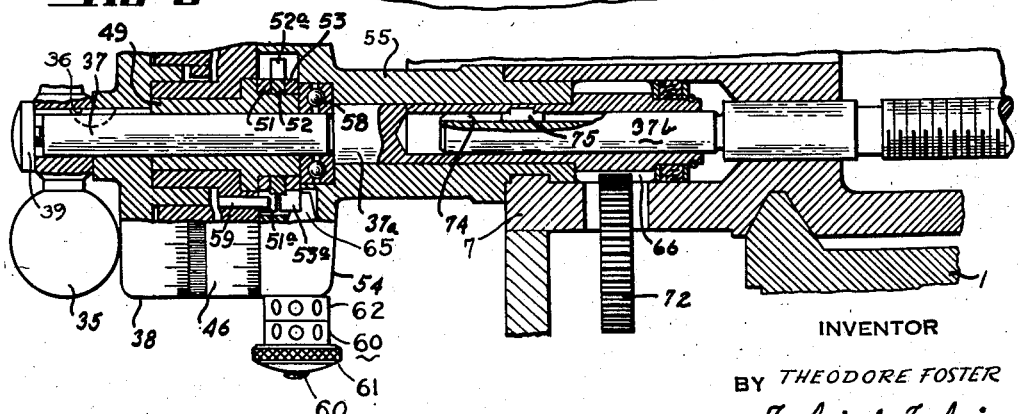

Referring to Figure 6, this is a modification of the feed screw. The modification consists in providing a telescopic lead screw. The shaft 37 is provided with a sleeve 37a in which is reciprocably mounted the lead screw 37b. The shaft 37a and the screw shaft 37b are telescopingly slidingly retained in engagement with one another in different telescopic positions by use of the keyway 74 in the shaft 37b and the key 75 projecting inwardly in the sleeve 37a and engaging in the keyway 74.

It will be understood that I desire to comprehend within my invention such modifications as may be fairly embraced with the hereinafter appended claims. It will be further understood that many changes in detailed mechanism may be made in carrying out my invention and I desire to comprehend within my invention such changes.

I claim:

1. In combination, a cross-slide, a compound pivotally mounted on said cross-slide, means manually operable in one direction for moving a cutting tool toward a workpiece in fine adjustment mounted upon said compound, means for moving said cross-slide and compound together comprising a manually operable means rotatable in either direction, an indicating dial, a clutch for connecting said manually operable means to said indicating dial, actuating means mounted on said indicating means, a plurality of locking members rotatably mounted with respect to said actuating means and adapted to be driven thereby when said clutch has connected said actuating means to said indicating dial, and means adapted to stop the rotation of said shaft and the movement of said cross-slide and compound by engaging with at least one of said locking members.

2. The combination of, a carriage, a cross-slide movable on said carriage, manually operable means to adjust the position of said cross-slide on said carriage, a plurality of inter-engaging members having limited free relative rotation and including a dial ring, said members being freely movable relative to said manually operable means, stop means stationarily mounted to engage one of said members to halt the movement thereof, and clutch means selectively operable to clutch or unclutch said dial ring and said manually operable means.

3. The combination of, a carriage and a cross-slide reciprocable thereon, manually operable means to reciprocate said cross-slide, a series of inter-engageable members having lost motion between each adjacent pair thereof and all thereof being freely movable relative to said manually operable means, adjustable stop means on said carriage to abut the last of said members, and friction clutch means selectively operable to clutch the first of said members to said manually operable means.

4. The combination of, a lathe carriage and a cross-slide reciprocable thereon, manually operable means to reciprocate said cross-slide, stop means on said carriage, a graduated indicator freely movable relative to said manually operable means, a plurality of members between said indicator and said stop means having lost motion to permit only limited movement of said indicator in at least one direction, and a friction clutch selectively operable to connect said indicator with said manually operable means.

5. In combination, first and second relatively reciprocable members, manually operable means including a screw carried by one of said members and engaging the other thereof for relatively reciprocating said members, a stop on one of said members, a graduated element movable on said manually operable means, a plurality of locking elements between said graduated element and said stop having lost motion to permit limited relative movement of said graduated element and said stop, and clutch means selectively operable to connect said graduated element with said manually operable means.

6. In a lathe having a carriage, a cross-slide, a manually operable screw in said carriage and a nut on said cross-slide engaging said screw, and means for stopping said screw in a predetermined position comprising a dial ring and a plurality of adjacent locking rings all of which are rotatable on said screw, each of said rings having lug means operable positively to engage said lug means on the adjacent ring after predetermined relative angular movements, clutch means operable to clutch said dial ring to said screw, and stop means on said carriage lying in the path of the lug means on the last of said locking rings comprising a member having an inclined surface to engage said last mentioned lug means and being movable to effect fine adjustment of the point of stopping said screw.

7. In a locking mechanism to limit the movement of a cross-slide, the combination of a lead screw shaft, a plurality of adjacent locking rings having a plurality of interengaging portions, a dial ring and means thereon adapted to engage with one of said rings to rotate said rings into interlocking engagement with one another, clutch means selectively operable to connect said dial ring with said lead screw shaft and an adjustable stop positioned to engage one of said rings to halt the rotation of said rings and therefore said shaft in one direction when said dial ring is clutched to said shaft.

8. In a lathe having a carriage with a cross-slide reciprocable thereon by a screw in said carriage, means of selectively stopping said screw and therefore said cross-slide in a predetermined position comprising, a first dial ring keyed to said screw, a second dial ring free on said screw, a locking ring having a radially projecting lug, lost motion means between said second dial ring and said locking ring effecting positive interengagement thereof in response to a predetermined relative rotation therebetween, a stop pin in said carriage having a conical end lying in the path of said lug, means of adjusting and locking said pin in position to make fine adjustments in the point of stopping said screw, and friction clutch means selectively operable to clutch said dial rings together.

THEODORE FOSTER.

REFERENCES CITED

The following references are of record in the file of this patent:

UNITED STATES PATENTS

| Number | Name | Date |
|---|---|---|
| 995,726 | Runge | June 20, 1911 |
| 1,799,311 | Moore | Apr. 7, 1931 |
| 2,105,962 | Bickel | Jan. 18, 1938 |
| 2,131,129 | Whitehead | Sept. 27, 1938 |